(12) United States Patent
Shih

(10) Patent No.: US 10,261,291 B2
(45) Date of Patent: Apr. 16, 2019

(54) LENS ASSEMBLY

(71) Applicants: Sintai Optical (Shenzhen) Co., Ltd., ShenZhen, Guangdong Province (CN); Asia Optical Co., Inc., Taichung (TW)

(72) Inventor: Po-Yuan Shih, Taichung (TW)

(73) Assignees: SINTAI OPTICAL (SHENZHEN) CO., LTD., Shenzhen, Guandong Province (CN); ASIA OPTICAL CO., INC., Taichung (TW)

( * ) Notice: Subject to any disclaimer, the term of this patent is extended or adjusted under 35 U.S.C. 154(b) by 0 days.

(21) Appl. No.: 15/588,886

(22) Filed: May 8, 2017

(65) Prior Publication Data

US 2017/0329110 A1    Nov. 16, 2017

(30) Foreign Application Priority Data

May 16, 2016 (CN) .......................... 2016 1 0324008

(51) Int. Cl.
 *G02B 9/60* (2006.01)
 *G02B 13/00* (2006.01)

(52) U.S. Cl.
 CPC ........... *G02B 13/0065* (2013.01); *G02B 9/60* (2013.01); *G02B 13/0045* (2013.01)

(58) Field of Classification Search
 CPC ....... G02B 9/60; G02B 13/04; G02B 13/0045

USPC .......................... 359/714, 753, 763, 764, 766
See application file for complete search history.

(56) References Cited

U.S. PATENT DOCUMENTS

2015/0085175 A1* 3/2015 Huang ..................... G02B 3/04
                                                         359/713
2015/0085183 A1* 3/2015 Chen .................. G02B 13/0045
                                                         348/374

FOREIGN PATENT DOCUMENTS

TW           I518360         1/2016

* cited by examiner

*Primary Examiner* — William Choi
(74) *Attorney, Agent, or Firm* — McClure, Qualey & Rodack, LLP

(57) ABSTRACT

A lens assembly includes a first lens, a second lens, a third lens, a fourth lens and a fifth lens, all of which are arranged in order from an object side to an image side along an optical axis. The first lens includes a convex surface facing the image side. The second lens includes a concave surface facing the object side. The third lens is a biconvex lens with positive refractive power. The fourth lens is with negative refractive power and includes a concave surface facing the object side. The fifth lens is with positive refractive power and includes a convex surface facing the image side. The lens assembly satisfies: $-20 \leq f_1/f \leq 2$, wherein $f_1$ is an effective focal length of the first lens and f is an effective focal length of the lens assembly.

20 Claims, 12 Drawing Sheets

1

LENS ASSEMBLY

BACKGROUND OF THE INVENTION

Field of the Invention

The invention relates to a lens assembly.

Description of the Related Art

Nowadays, the development trend of digital still cameras and mobile phones are continuously toward high pixel number and lightweight. Therefore, the demand for lens assemblies which are with miniaturization and high resolution increases significantly. The volume of known lens assembly is relatively large and can't satisfy requirement of present. Therefore, a lens assembly that is used for digital still cameras and mobile phones needs a new structure in order to meet the requirements of miniaturization and high resolution at the same time.

BRIEF SUMMARY OF THE INVENTION

The invention provides a lens assembly to solve the above problems. The lens assembly of the invention is provided with characteristics of a shortened total lens length, a good optical performance and meets the requirement of resolution.

The lens assembly in accordance with the invention includes a first lens, a second lens, a third lens, a fourth lens and a fifth lens, all of which are arranged in order from an object side to an image side along an optical axis. The first lens includes a convex surface facing the image side. The second lens includes a concave surface facing the object side. The third lens is a biconvex lens with positive refractive power. The fourth lens is with negative refractive power and includes a concave surface facing the object side. The fifth lens is with positive refractive power and includes a convex surface facing the image side. The lens assembly satisfies: $-20 \leq f_1/f \leq 2$, wherein $f_1$ is an effective focal length of the first lens and f is an effective focal length of the lens assembly.

The lens assembly satisfies: $0.4 \leq BFL/TTL \leq 0.9$, wherein BFL is an interval from the convex surface of the fifth lens to an image plane along the optical axis and TTL is an interval from an object side surface of the first lens to the image plane along the optical axis.

The lens assembly satisfies: $2 \leq (R_{31}-R_{32})/(R_{31}+R_{32}) \leq 10$, wherein $R_{31}$ is a radius of curvature of an object side surface of the third lens and $R_{32}$ is a radius of curvature of an image side surface of the third lens.

The lens assembly further includes a prism which includes an incident surface facing the convex surface of the fifth lens.

The lens assembly further includes an optical filter disposed between the fifth lens and the prism.

At least one of the first lens and the second lens is with negative refractive power.

The first lens and the second lens have refractive powers of opposite signs.

The first lens is with negative refractive power and the second lens is with negative refractive power.

The lens assembly further includes a stop disposed between the object side and the first lens.

The lens assembly satisfies: $-15 \leq f_1/f \leq 1$, wherein $f_1$ is an effective focal length of the first lens and f is an effective focal length of the lens assembly.

The lens assembly in accordance with the invention includes a first lens, a second lens, a third lens, a fourth lens, a fifth lens, an optical filter and a prism, all of which are arranged in order from an object side to an image side along an optical axis. The first lens includes a convex surface facing the image side. The second lens includes a concave surface facing the object side. The third lens is a biconvex lens with positive refractive power. The fourth lens is with negative refractive power and includes a concave surface facing the object side. The fifth lens is with positive refractive power and includes a convex surface facing the image side. The prism includes an incident surface facing an image side surface of the optical filter. The lens assembly satisfies: $2 \leq (R_{31}-R_{32})/(R_{31}+R_{32}) \leq 10$, wherein $R_{31}$ is a radius of curvature of an object side surface of the third lens and $R_{32}$ is a radius of curvature of an image side surface of the third lens.

At least one of the first lens and the second lens is with negative refractive power.

The first lens and the second lens have refractive powers of opposite signs.

The first lens is with negative refractive power and the second lens is with negative refractive power.

The lens assembly further includes a stop disposed between the object side and the first lens.

The lens assembly satisfies: $-20 \leq f_1/f \leq 2$, wherein $f_1$ is an effective focal length of the first lens and f is an effective focal length of the lens assembly.

The lens assembly satisfies: $0.4 \leq BFL/TTL \leq 0.9$, wherein BFL is an interval from the convex surface of the fifth lens to an image plane along the optical axis and TTL is an interval from an object side surface of the first lens to the image plane along the optical axis.

The lens assembly satisfies: $2 \leq (R_{31}-R_{32})/(R_{31}+R_{32}) \leq 6$, wherein $R_{31}$ is a radius of curvature of an object side surface of the third lens and $R_{32}$ is a radius of curvature of an image side surface of the third lens.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
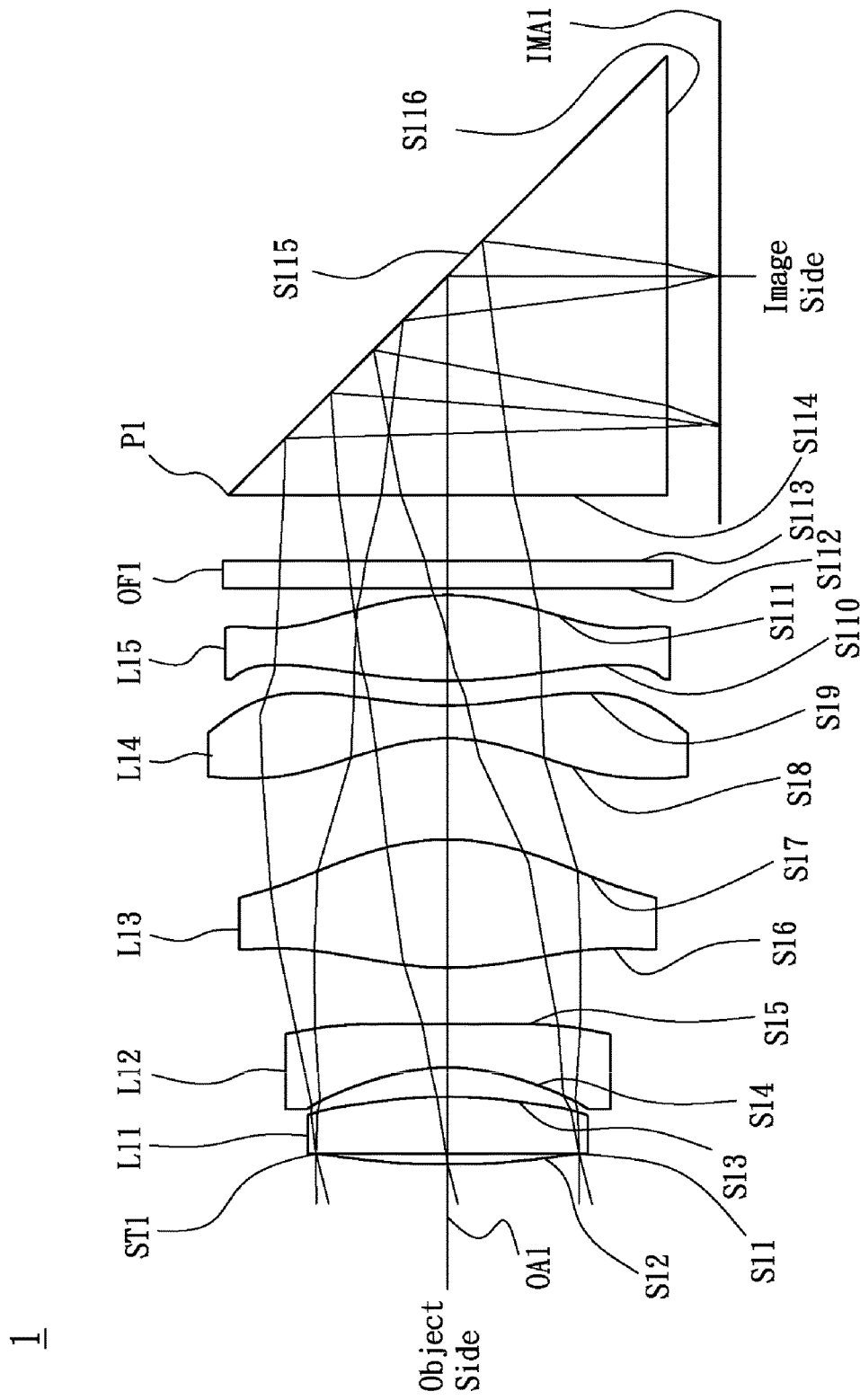
FIG. 1 is a lens layout and optical path diagram of a lens assembly in accordance with a first embodiment of the invention.

Referring to FIG. 1, FIG. 1 is a lens layout and optical path diagram of a lens assembly in accordance with a first embodiment of the invention. The lens assembly 1 includes a stop ST1, a first lens L11, a second lens L12, a third lens L13, a fourth lens L14, a fifth lens L15, an optical filter OF1 and a prism P1, all of which are arranged in order from an object side to an image side along an optical axis OA1. In operation, an image of light rays from the object side is formed at an image plane IMA1.

The first lens L11 is a biconvex lens with positive refractive power and made of plastic material, wherein the object side surface S12 is a convex surface, the image side surface S13 is a convex surface and both of the object side surface S12 and image side surface S13 are aspheric surfaces.

The second lens L12 is a biconcave lens with negative refractive power and made of plastic material, wherein the object side surface S14 is a concave surface, the image side surface S15 is a concave surface and both of the object side surface S14 and image side surface S15 are aspheric surfaces.

The third lens L13 is a biconvex lens with positive refractive power and made of plastic material, wherein the object side surface S16 is a convex surface, the image side surface S17 is a convex surface and both of the object side surface S16 and image side surface S17 are aspheric surfaces.

The fourth lens L14 is a biconcave lens with negative refractive power and made of plastic material, wherein the object side surface S18 is a concave surface, the image side surface S19 is a concave surface and both of the object side surface S18 and image side surface S19 are aspheric surfaces.

The fifth lens L15 is a biconvex lens with positive refractive power and made of plastic material, wherein the object side surface S110 is a convex surface, the image side surface S111 is a convex surface and both of the object side surface S110 and image side surface S111 are aspheric surfaces.

Both of the object side surface S112 and image side surface S113 of the optical filter OF1 are plane surfaces.

All of the incident surface S114, reflection surface S115 and exit surface S116 of the prism P1 are plane surfaces. Light rays from the object side enter the prism P1 from the incident surface S114, change the light traveling direction by the reflection surface S115, leave the prism P1 from the exit surface S116, and finally image on the image plane IMA1. The main function of the prism P1 is to change the traveling direction of the incident light rays in order to achieve the purpose of shortening the total lens length.

In order to maintain excellent optical performance of the lens assembly in accordance with the first embodiment of the invention, the lens assembly 1 satisfies at least one of the following conditions:

$$-20 \leq f1_1/f1 \leq 2 \quad (1)$$

$$0.4 \leq BFL1/TTL1 \leq 0.9 \quad (2)$$

$$2 \leq (R1_{31} - R1_{32})/(R1_{31} + R1_{32}) \quad (3)$$

wherein $f1_1$ is an effective focal length of the first lens L11, f1 is an effective focal length of the lens assembly 1, BFL1 is an interval from the image side surface S111 of the fifth lens L15 to the image plane IMA1 along the optical axis OA1, TTL1 is an interval from the object side surface S12 of the first lens L11 to the image plane IMA1 along the optical axis OA1, $R1_{31}$ is a radius of curvature of the object side surface S16 of the third lens L13 and $R1_{32}$ is a radius of curvature of the image side surface S17 of the third lens L13.

By the above design of the lenses, stop ST1 and prism P1, the lens assembly 1 is provided with a shortened total lens length, an effective corrected aberration and meets the requirement of resolution.

In order to achieve the above purposes and effectively enhance the optical performance, the lens assembly 1 in accordance with the first embodiment of the invention is provided with the optical specifications shown in Table 1, which include the effective focal length, F-number, total lens length, radius of curvature of each lens surface, thickness between adjacent surface, refractive index of each lens and Abbe number of each lens. Table 1 shows that the effective focal length is equal to 4.4132 mm, F-number is equal to 2.2 and total lens length is equal to 8.842 mm for the lens assembly 1 of the first embodiment of the invention.

TABLE 1

Effective Focal Length = 4.4132 mm
F-number = 2.2
Total Lens Length = 8.842 mm

| Surface Number | Radius of Curvature (mm) | Thickness (mm) | Nd | Vd | Remark |
|---|---|---|---|---|---|
| S11 | ∞ | 0.000 | | | Stop ST1 |
| S12 | 5.951 | 0.513 | 1.535 | 55.7 | The First Lens L11 |
| S13 | −3.586 | 0.222 | | | |
| S14 | −1.536 | 0.331 | 1.614 | 25.6 | The Second Lens L12 |
| S15 | 34.641 | 0.429 | | | |
| S16 | 2.435 | 0.976 | 1.535 | 55.7 | The Third Lens L13 |
| S17 | −1.729 | 0.774 | | | |
| S18 | −1.501 | 0.251 | 1.614 | 25.6 | The Fourth Lens L14 |
| S19 | 2.607 | 0.189 | | | |
| S110 | 3.590 | 0.652 | 1.535 | 55.7 | The Fifth Lens L15 |
| S111 | −1.907 | 0.050 | | | |
| S112 | ∞ | 0.210 | 1.517 | 64.2 | Optical Filter OF1 |
| S113 | ∞ | 0.500 | | | |
| S114 | ∞ | 1.670 | 1.847 | 23.8 | Incident Surface, Prism P1 |
| S115 | ∞ | 1.670 | 1.847 | 23.8 | Reflection Surface, Prism P1 |
| S116 | ∞ | 0.403 | | | Exit Surface, Prism P1 |

The aspheric surface sag z of each lens in table 1 can be calculated by the following formula:

$$z = ch^2/\{1 + [1 - (k+1)c^2h^2]^{1/2}\} + Ah^4 + Bh^6 + Ch^8 + Dh^{10} + Eh^{12}$$

where c is curvature, h is the vertical distance from the lens surface to the optical axis, k is conic constant and A, B, C, D and E are aspheric coefficients.

In the first embodiment, the conic constant k and the aspheric coefficients A, B, C, D, E of each surface are shown in Table 2.

TABLE 2

| | Surface Number | | | | |
|---|---|---|---|---|---|
| | S12 | S13 | S14 | S15 | S16 |
| k | −9.8617E−01 | −7.9157E+00 | −3.8686E+00 | 0.0000E+00 | −1.1763E+01 |
| A | −4.6946E−03 | 1.5655E−02 | 1.4362E−02 | −4.1932E−02 | −1.6787E−02 |
| B | 3.4998E−03 | 1.4162E−02 | −1.5840E−02 | −2.1003E−03 | −9.7318E−03 |
| C | 3.9044E−03 | −3.1464E−03 | −3.6970E−03 | −5.9618E−03 | −3.6788E−04 |
| D | 1.4620E−03 | −9.0644E−03 | −1.8567E−03 | 8.2491E−04 | 1.2522E−03 |
| E | −8.5623E−03 | −1.0580E−02 | −3.4508E−03 | 2.5693E−03 | −8.0922E−05 |

| | Surface Number | | | | |
|---|---|---|---|---|---|
| | S17 | S18 | S19 | S110 | S111 |
| k | −1.9247E+00 | −1.9548E+00 | −1.8659E+01 | −1.7628E+01 | −2.0590E+00 |
| A | 2.9690E−02 | 6.3619E−02 | −3.3955E−02 | −9.6107E−03 | 3.4257E−02 |
| B | −8.2945E−03 | 1.0036E−02 | −9.6721E−04 | −2.9451E−03 | 1.0369E−02 |
| C | 3.3987E−03 | −3.9626E−03 | −1.5231E−03 | 9.6226E−05 | 1.4652E−03 |
| D | 1.4845E−03 | −1.0220E−03 | −5.9879E−04 | −3.9140E−05 | −3.5421E−04 |
| E | −6.3861E−04 | 3.0089E−04 | 2.3872E−04 | −2.4923E−04 | −2.9906E−04 |

For the lens assembly 1 of the first embodiment, the effective focal length f1 is equal to 4.4132 mm, the effective focal length $f1_1$ of the first lens L11 is equal to 4.31710 mm, the interval BFL1 from the image side surface S111 of the fifth lens L15 to the image plane IMA1 along the optical axis OA1 is equal to 4.503 mm, the interval TTL1 from the object side surface S12 of the first lens L11 to the image plane IMA1 along the optical axis OA1 is equal to 8.842 mm, the radius of curvature $R1_{31}$ of the object side surface S16 of the third lens L13 is equal to 2.435 mm and the radius of curvature $R1_{32}$ of the image side surface S17 of the third lens L13 is equal to −1.729 mm. According to the above data, the following values can be obtained:

$$f1_1/f1=0.978,$$

$$BFL1/TTL1=0.509,$$

$$(R1_{31}-R1_{32})/(R1_{31}+R1_{32})=5.898$$

which respectively satisfy the above conditions (1)-(3).

Figure 2A:
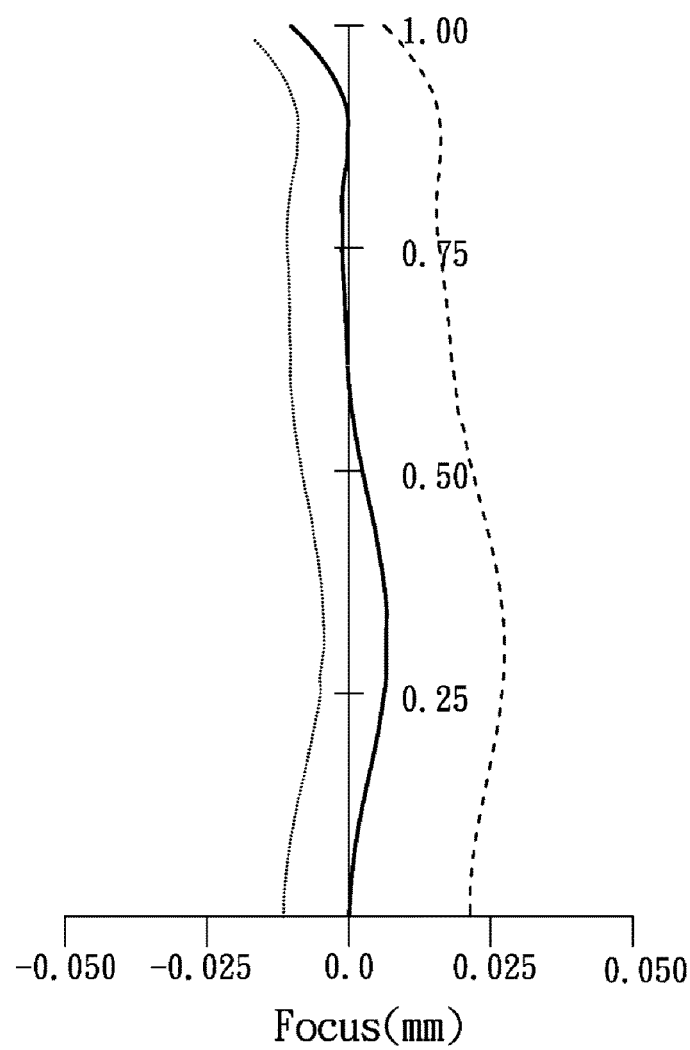
FIG. 2A depicts a longitudinal spherical aberration diagram of the lens assembly in accordance with the first embodiment of the invention.
Figure 2B:
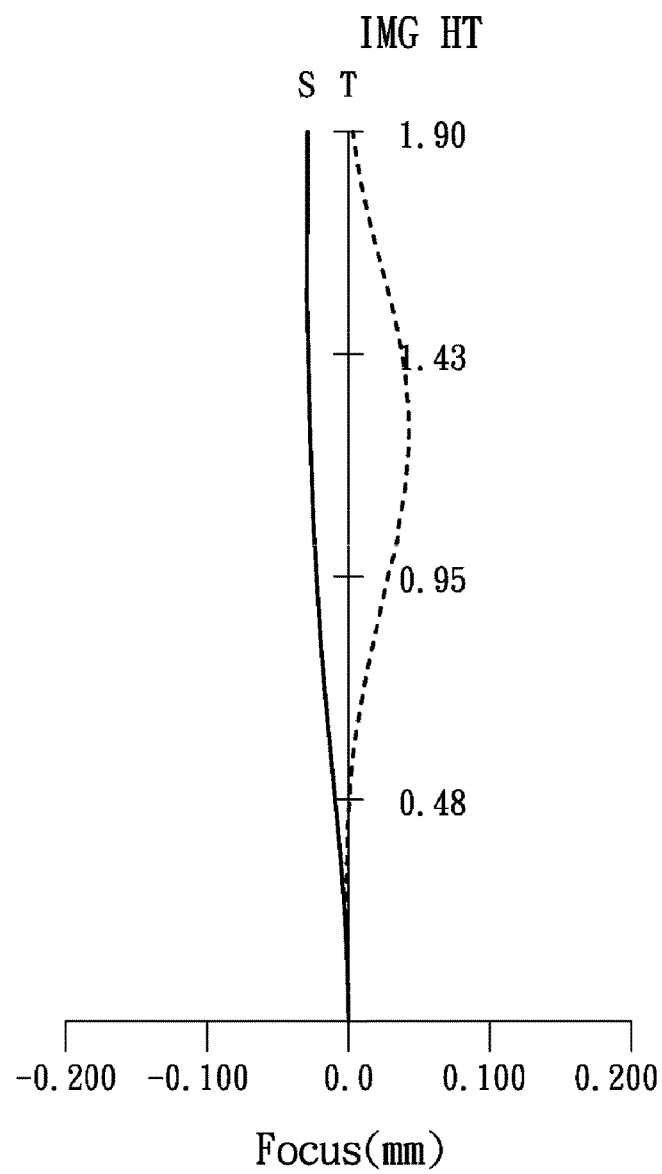
FIG. 2B is an astigmatic field curves diagram of the lens assembly in accordance with the first embodiment of the invention.
Figure 2C:
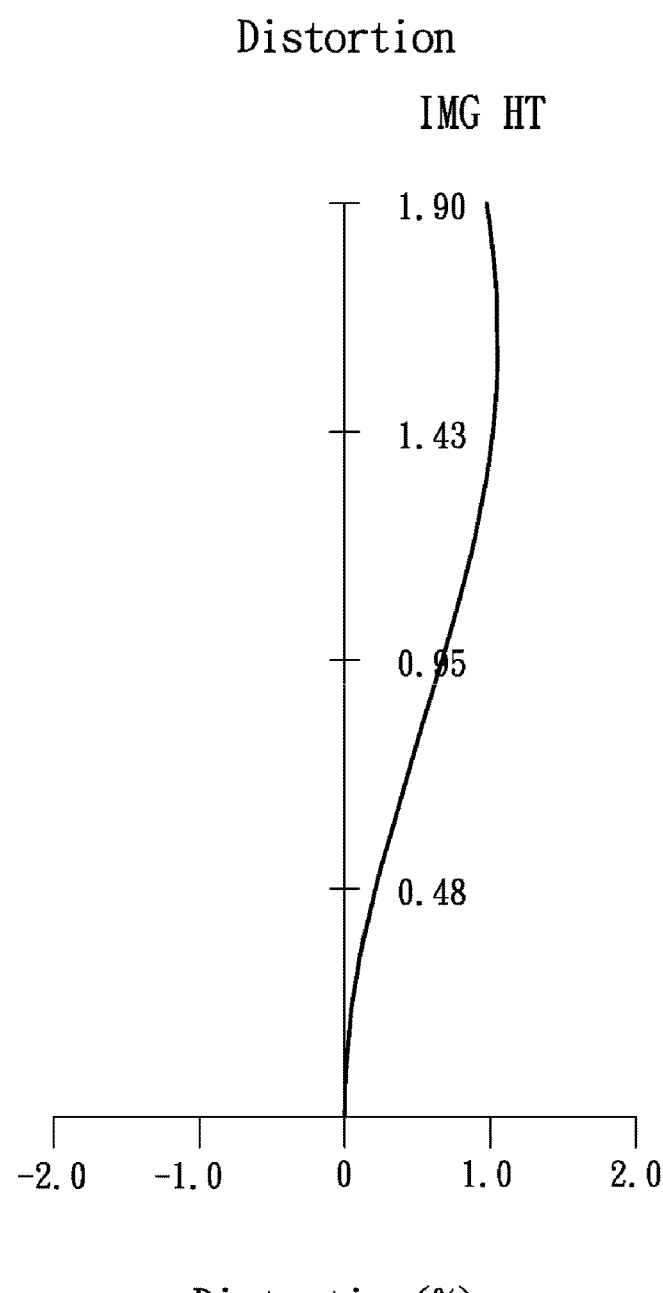
FIG. 2C is a distortion diagram of the lens assembly in accordance with the first embodiment of the invention.

By the above arrangements of the lenses, stop ST1 and prism P1, the lens assembly 1 of the first embodiment can meet the requirements of optical performance as seen in FIGS. 2A-2C, wherein FIG. 2A shows a longitudinal spherical aberration diagram of the lens assembly 1 in accordance with the first embodiment of the invention, FIG. 2B shows an astigmatic field curves diagram of the lens assembly 1 in accordance with the first embodiment of the invention and FIG. 2C shows a distortion diagram of the lens assembly 1 in accordance with the first embodiment of the invention.

It can be seen from FIG. 2A that the longitudinal spherical aberration in the lens assembly 1 of the first embodiment ranges from −0.025 mm to 0.030 mm for the wavelength of 760.0000 nm, 820.0000 nm and 860.0000 nm.

It can be seen from FIG. 2B that the astigmatic field curves of tangential direction and sagittal direction in the lens assembly 1 of the first embodiment ranges from −0.050 mm to 0.050 mm for the wavelength of 820.0000 nm.

It can be seen from FIG. 2C that the distortion in the lens assembly 1 of the first embodiment ranges from 0% to 1.1% for the wavelength of 820.0000 nm.

It is obvious that the longitudinal spherical aberration, the astigmatic field curves and the distortion of the lens assembly 1 of the first embodiment can be corrected effectively. Therefore, the lens assembly 1 of the first embodiment is capable of good optical performance.

Figure 3:
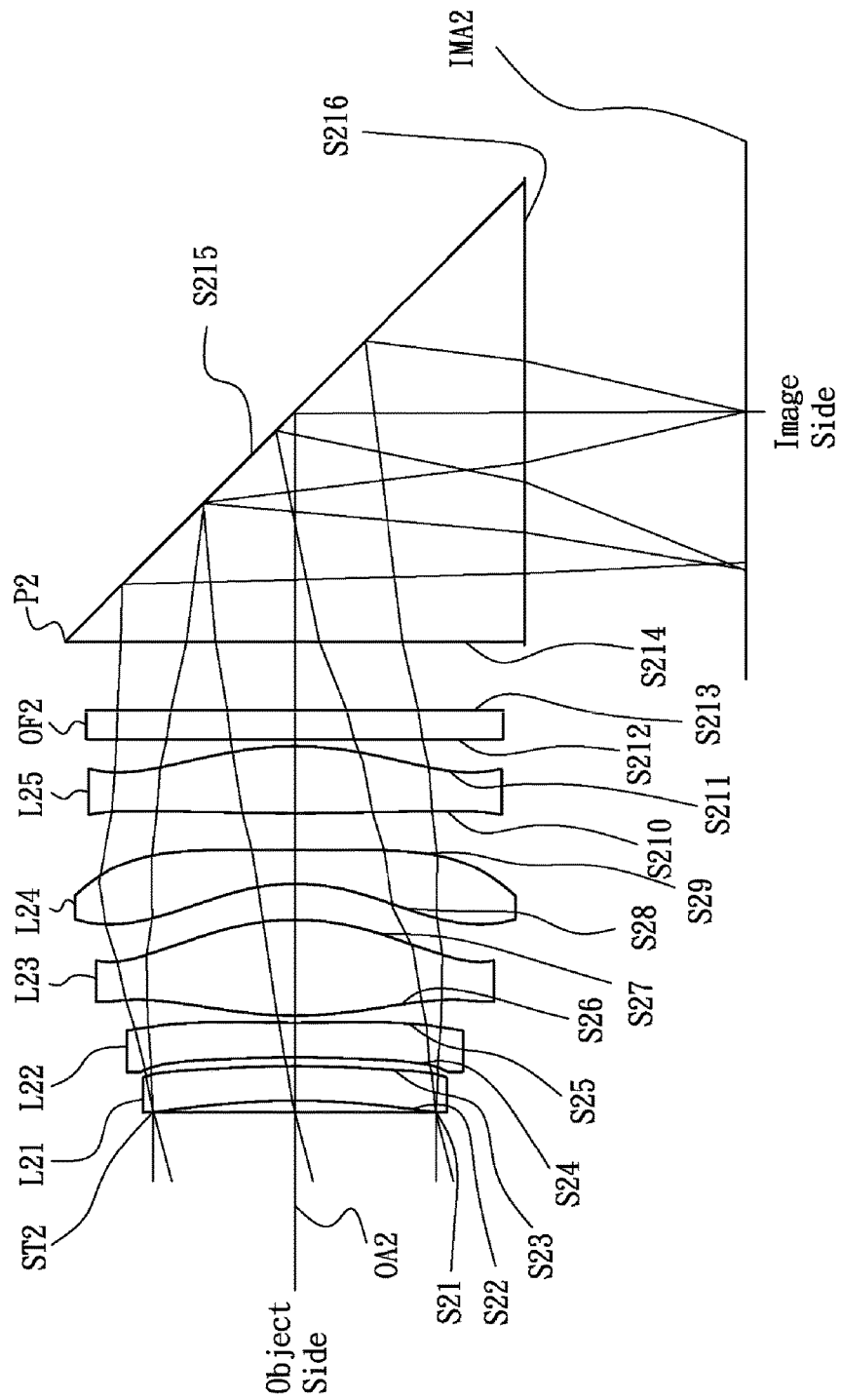
FIG. 3 is a lens layout and optical path diagram of a lens assembly in accordance with a second embodiment of the invention.

Referring to FIG. 3, FIG. 3 is a lens layout and optical path diagram of a lens assembly in accordance with a second embodiment of the invention. The lens assembly 2 includes a stop ST2, a first lens L21, a second lens L22, a third lens L23, a fourth lens L24, a fifth lens L25, an optical filter OF2 and a prism P2, all of which are arranged in order from an object side to an image side along an optical axis OA2. In operation, an image of light rays from the object side is formed at an image plane IMA2.

The first lens L21 is a meniscus lens with negative refractive power and made of plastic material, wherein the object side surface S22 is a concave surface, the image side surface S23 is a convex surface and both of the object side surface S22 and image side surface S23 are aspheric surfaces.

The second lens L22 is a biconcave lens with negative refractive power and made of plastic material, wherein the object side surface S24 is a concave surface, the image side surface S25 is a concave surface and both of the object side surface S24 and image side surface S25 are aspheric surfaces.

The third lens L23 is a biconvex lens with positive refractive power and made of plastic material, wherein the object side surface S26 is a convex surface, the image side surface S27 is a convex surface and both of the object side surface S26 and image side surface S27 are aspheric surfaces.

The fourth lens L24 is a biconcave lens with negative refractive power and made of plastic material, wherein the object side surface S28 is a concave surface, the image side surface S29 is a concave surface and both of the object side surface S28 and image side surface S29 are aspheric surfaces.

The fifth lens L25 is a biconvex lens with positive refractive power and made of plastic material, wherein the object side surface S210 is a convex surface, the image side surface S211 is a convex surface and both of the object side surface S210 and image side surface S211 are aspheric surfaces.

Both of the object side surface S212 and image side surface S213 of the optical filter OF2 are plane surfaces.

All of the incident surface S214, reflection surface S215 and exit surface S216 of the prism P2 are plane surfaces. Light rays from the object side enter the prism P2 from the incident surface S214, change the light traveling direction by the reflection surface S215, leave the prism P2 from the exit surface S216, and finally image on the image plane IMA2. The main function of the prism P2 is to change the traveling direction of the incident light rays in order to achieve the purpose of shortening the total lens length.

In order to maintain excellent optical performance of the lens assembly in accordance with the second embodiment of the invention, the lens assembly 2 satisfies at least one of the following conditions:

$$-20 \leq f2_1/f2 \leq 2 \quad (4)$$

$$0.4 \leq BFL2/TTL2 \leq 0.9 \quad (5)$$

$$2 \leq (R2_{31}-R2_{32})/(R2_{31}+R2_{32}) \leq 10 \quad (6)$$

wherein $f2_1$ is an effective focal length of the first lens L21, f2 is an effective focal length of the lens assembly 2, BFL2 is an interval from the image side surface S211 of the fifth lens L25 to the image plane IMA2 along the optical axis OA2, TTL2 is an interval from the object side surface S22 of the first lens L21 to the image plane IMA2 along the optical axis OA2, $R2_{31}$ is a radius of curvature of the object side surface S26 of the third lens L23 and $R2_{32}$ is a radius of curvature of the image side surface S27 of the third lens L23.

By the above design of the lenses, stop ST2 and prism P2, the lens assembly 2 is provided with a shortened total lens length, an effective corrected aberration and meets the requirement of resolution.

In order to achieve the above purposes and effectively enhance the optical performance, the lens assembly 2 in accordance with the second embodiment of the invention is provided with the optical specifications shown in Table 3, which include the effective focal length, F-number, total lens length, radius of curvature of each lens surface, thickness between adjacent surface, refractive index of each lens and Abbe number of each lens. Table 3 shows that the effective focal length is equal to 4.5294 mm, F-number is equal to 2.3 and total lens length is equal to 8.283 mm for the lens assembly 2 of the second embodiment of the invention.

TABLE 3

Effective Focal Length = 4.5294 mm
F-number = 2.3
Total Lens Length = 8.283 mm

| Surface Number | Radius of Curvature (mm) | Thickness (mm) | Nd | Vd | Remark |
|---|---|---|---|---|---|
| S21 | ∞ | 0.000 | | | Stop ST2 |
| S22 | −5.289 | 0.250 | 1.535 | 55.7 | The First Lens L21 |
| S23 | −7.978 | 0.063 | | | |
| S24 | −9.736 | 0.251 | 1.614 | 25.6 | The Second Lens L22 |
| S25 | 24.980 | 0.051 | | | |
| S26 | 2.801 | 0.695 | 1.535 | 55.7 | The Third Lens L23 |
| S27 | −1.719 | 0.260 | | | |
| S28 | −1.449 | 0.250 | 1.614 | 25.6 | The Fourth Lens L24 |
| S29 | 56.686 | 0.268 | | | |
| S210 | 22.223 | 0.483 | 1.535 | 55.7 | The Fifth Lens L25 |
| S211 | −2.394 | 0.050 | | | |
| S212 | ∞ | 0.210 | 1.517 | 64.2 | Optical Filter OF2 |
| S213 | ∞ | 0.500 | | | |
| S214 | ∞ | 1.670 | 1.847 | 23.8 | Incident Surface, Prism P2 |
| S215 | ∞ | 1.670 | 1.847 | 23.8 | Reflection Surface, Prism P2 |
| S216 | ∞ | 1.611 | | | Exit Surface, Prism P2 |

The aspheric surface sag z of each lens in table 3 can be calculated by the following formula:

$$z = ch^2/\{1+[1-(k+1)c^2h^2]^{1/2}\} + Ah^4 + Bh^6 + Ch^8 + Dh^{10} + Eh^{12}$$

where c is curvature, h is the vertical distance from the lens surface to the optical axis, k is conic constant and A, B, C, D and E are aspheric coefficients.

In the second embodiment, the conic constant k and the aspheric coefficients A, B, C, D, E of each surface are shown in Table 4.

TABLE 4

| | Surface Number | | | | |
|---|---|---|---|---|---|
| | S22 | S23 | S24 | S25 | S26 |
| k | −1.4765E+01 | −4.8338E+00 | −5.5421E+00 | 0.0000E+00 | −1.0929E+01 |
| A | −3.5262E−03 | 1.2729E−02 | 1.8263E−02 | −4.1378E−02 | −2.2867E−02 |
| B | 4.2729E−03 | 1.4274E−02 | −1.5789E−02 | −5.7661E−04 | −1.3154E−02 |
| C | 6.0491E−03 | −2.5072E−03 | −4.3492E−03 | −5.5926E−03 | −6.3123E−04 |
| D | 3.9795E−03 | −7.7608E−03 | −3.2478E−03 | 8.6163E−04 | 1.6246E−03 |
| E | −6.2116E−03 | −8.6662E−03 | −5.5218E−03 | 2.6756E−03 | −2.6310E−05 |

| | Surface Number | | | | |
|---|---|---|---|---|---|
| | S27 | S28 | S29 | S210 | S211 |
| k | −2.1549E+00 | −1.9610E+00 | 2.3820E+00 | −9.0000E+01 | −1.9620E+00 |
| A | 3.5331E−02 | 6.4697E−02 | −3.8225E−02 | −9.2857E−03 | 3.3183E−02 |
| B | −4.2214E−03 | 1.1451E−02 | −3.0574E−03 | −1.2720E−03 | 9.7516E−03 |
| C | 4.2278E−03 | −3.1992E−03 | −2.1625E−03 | 1.4857E−03 | 9.7180E−04 |

TABLE 4-continued

| | | | | | |
|---|---|---|---|---|---|
| D | 1.5876E−03 | −8.8991E−04 | −5.6096E−04 | 2.4652E−04 | −3.0839E−04 |
| E | −4.3800E−04 | 2.7047E−04 | 3.4383E−04 | −3.7849E−04 | −1.1747E−04 |

For the lens assembly 2 of the second embodiment, the effective focal length f2 is equal to 4.5294 mm, the effective focal length $f2_1$ of the first lens L21 is equal to −30.69820 mm, the interval BFL2 from the image side surface S211 of the fifth lens L25 to the image plane IMA2 along the optical axis OA2 is equal to 5.711 mm, the interval TTL2 from the object side surface S22 of the first lens L21 to the image plane IMA2 along the optical axis OA2 is equal to 8.283 mm, the radius of curvature $R2_{31}$ of the object side surface S26 of the third lens L23 is equal to 2.801 mm and the radius of curvature $R2_{32}$ of the image side surface S27 of the third lens L23 is equal to −1.719 mm. According to the above data, the following values can be obtained:

$$f2_1/f2=-6.778,$$

$$BFL2/TTL2=0.689,$$

$$(R2_{31}-R2_{32})/(R2_{31}+R2_{32})=4.177$$

which respectively satisfy the above conditions (4)-(6).

Figure 4A:
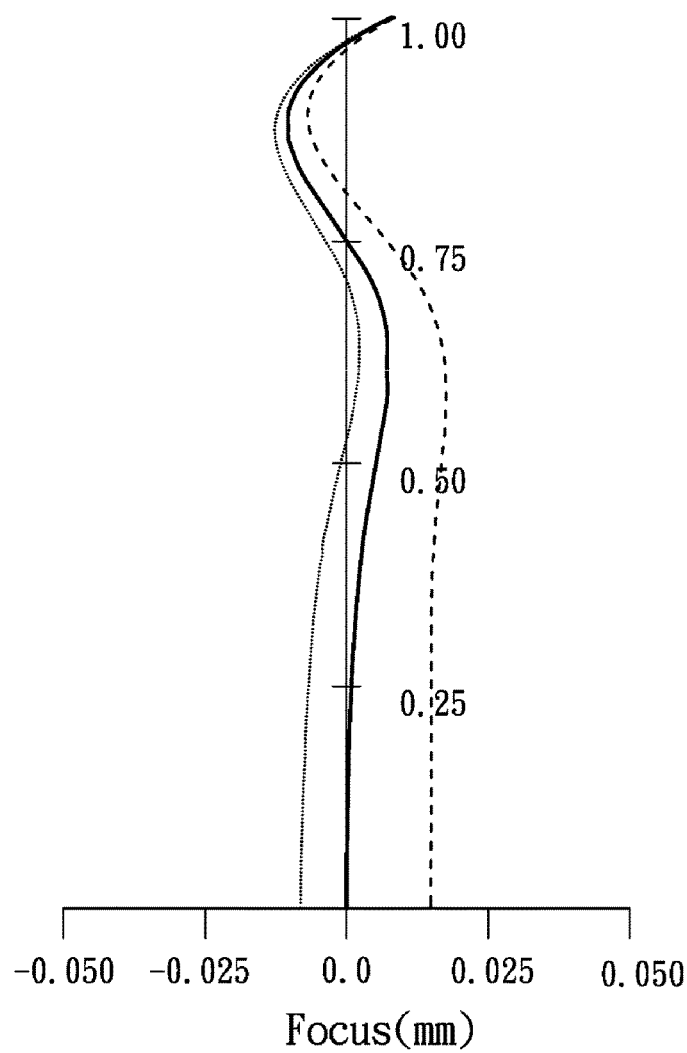
FIG. 4A depicts a longitudinal spherical aberration diagram of the lens assembly in accordance with the second embodiment of the invention.
Figure 4B:
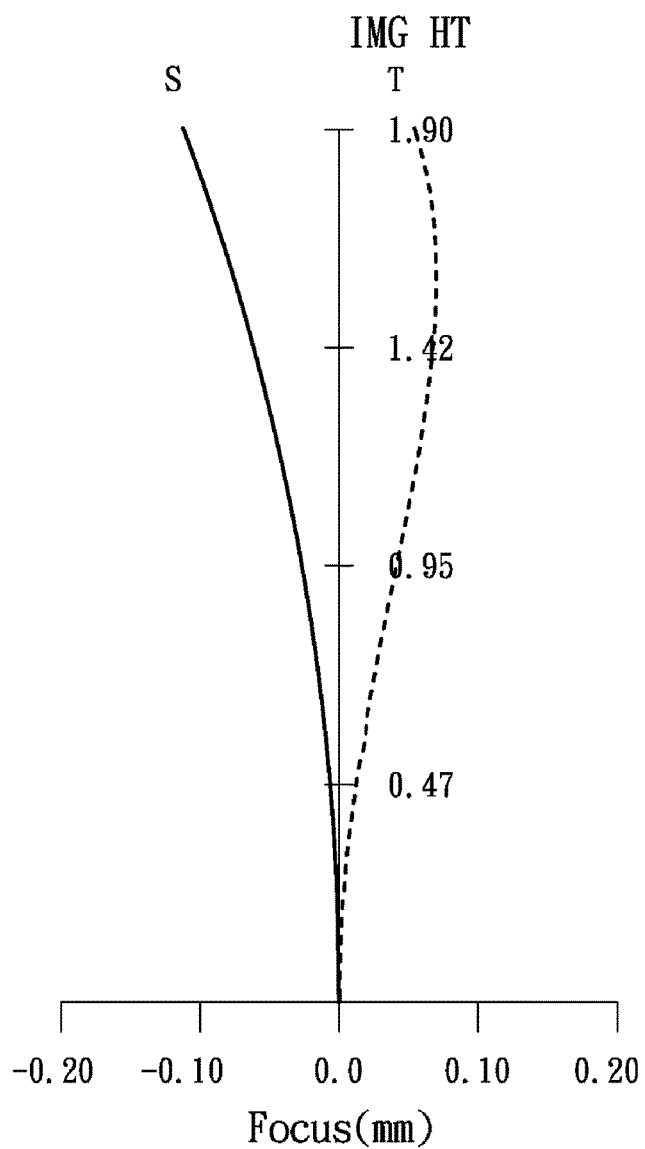
FIG. 4B is an astigmatic field curves diagram of the lens assembly in accordance with the second embodiment of the invention.
Figure 4C:
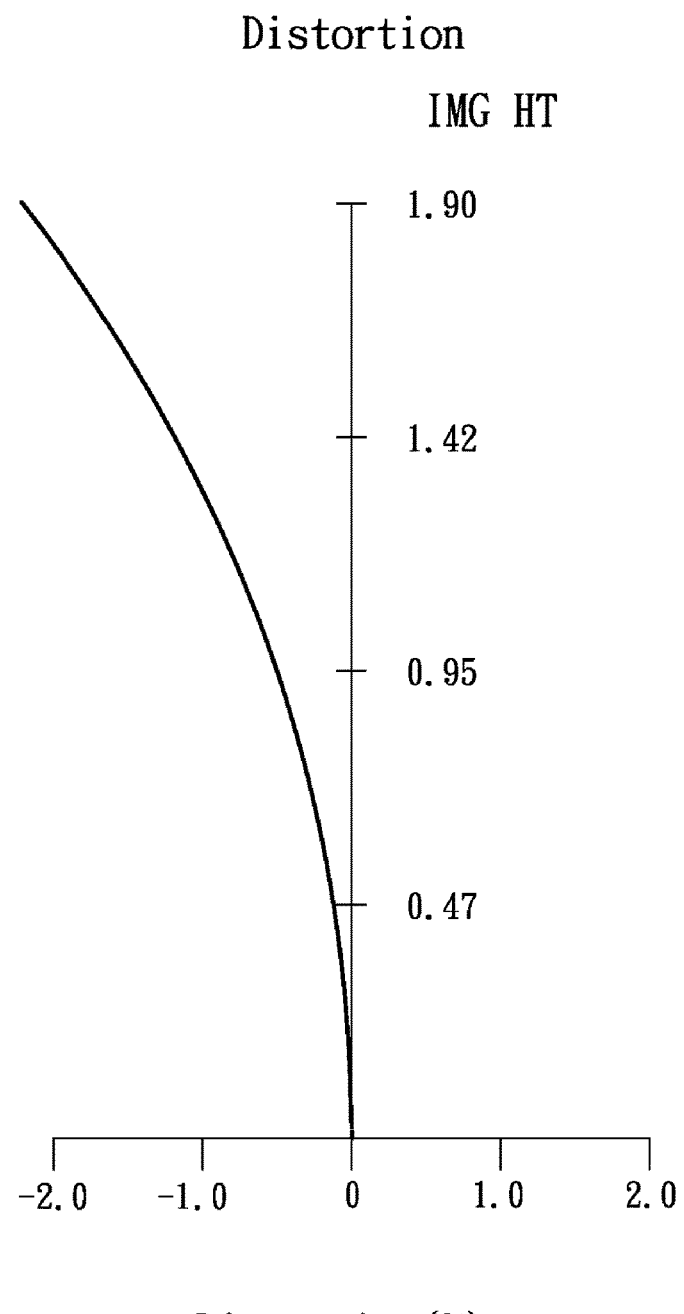
FIG. 4C is a distortion diagram of the lens assembly in accordance with the second embodiment of the invention.

By the above arrangements of the lenses, stop ST2 and prism P2, the lens assembly 2 of the second embodiment can meet the requirements of optical performance as seen in FIGS. 4A-4C, wherein FIG. 4A shows a longitudinal spherical aberration diagram of the lens assembly 2 in accordance with the second embodiment of the invention, FIG. 4B shows an astigmatic field curves diagram of the lens assembly 2 in accordance with the second embodiment of the invention and FIG. 4C shows a distortion diagram of the lens assembly 2 in accordance with the second embodiment of the invention.

It can be seen from FIG. 4A that the longitudinal spherical aberration in the lens assembly 2 of the second embodiment ranges from −0.025 mm to 0.025 mm for the wavelength of 760.0000 nm, 820.0000 nm and 860.0000 nm.

It can be seen from FIG. 4B that the astigmatic field curves of tangential direction and sagittal direction in the lens assembly 2 of the second embodiment ranges from −0.15 mm to 0.07 mm for the wavelength of 820.0000 nm.

It can be seen from FIG. 4C that the distortion in the lens assembly 2 of the second embodiment ranges from −2.3% to 0% for the wavelength of 820.0000 nm.

It is obvious that the longitudinal spherical aberration, the astigmatic field curves and the distortion of the lens assembly 2 of the second embodiment can be corrected effectively. Therefore, the lens assembly 2 of the second embodiment is capable of good optical performance.

Figure 5:
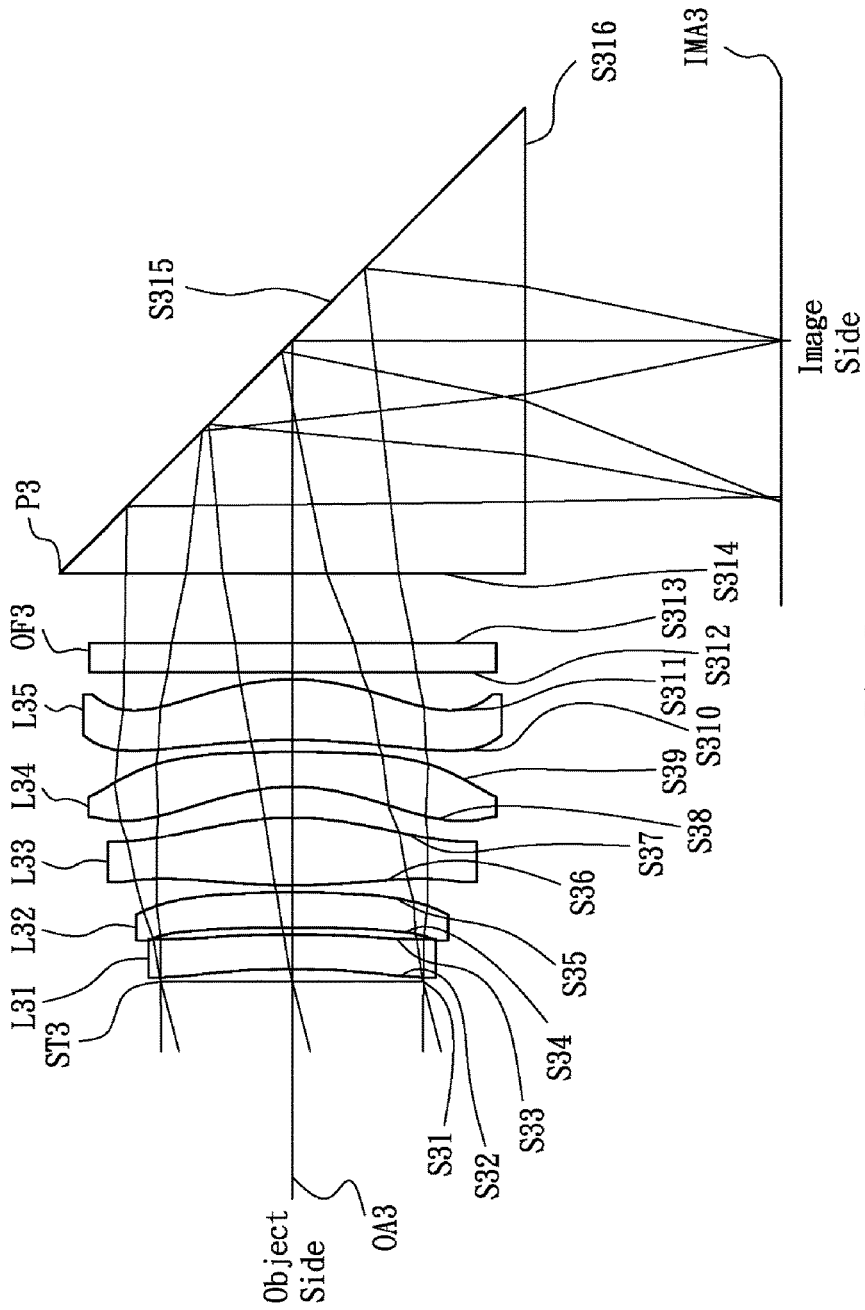
FIG. 5 is a lens layout and optical path diagram of a lens assembly in accordance with a third embodiment of the invention.

Referring to FIG. 5, FIG. 5 is a lens layout and optical path diagram of a lens assembly in accordance with a third embodiment of the invention. The lens assembly 3 includes a stop ST3, a first lens L31, a second lens L32, a third lens L33, a fourth lens L34, a fifth lens L35, an optical filter OF3 and a prism P3, all of which are arranged in order from an object side to an image side along an optical axis OA3. In operation, an image of light rays from the object side is formed at an image plane IMA3.

The first lens L31 is a meniscus lens with negative refractive power and made of plastic material, wherein the object side surface S32 is a concave surface, the image side surface S33 is a convex surface and both of the object side surface S32 and image side surface S33 are aspheric surfaces.

The second lens L32 is a meniscus lens with positive refractive power and made of plastic material, wherein the object side surface S34 is a concave surface, the image side surface S35 is a convex surface and both of the object side surface S34 and image side surface S35 are aspheric surfaces.

The third lens L33 is a biconvex lens with positive refractive power and made of plastic material, wherein the object side surface S36 is a convex surface, the image side surface S37 is a convex surface and both of the object side surface S36 and image side surface S37 are aspheric surfaces.

The fourth lens L34 is a meniscus lens with negative refractive power and made of plastic material, wherein the object side surface S38 is a concave surface, the image side surface S39 is a convex surface and both of the object side surface S38 and image side surface S39 are aspheric surfaces.

The fifth lens L35 is a meniscus lens with positive refractive power and made of plastic material, wherein the object side surface S310 is a concave surface, the image side surface S311 is a convex surface and both of the object side surface S310 and image side surface S311 are aspheric surfaces.

Both of the object side surface S312 and image side surface S313 of the optical filter OF3 are plane surfaces.

All of the incident surface S314, reflection surface S315 and exit surface S316 of the prism P3 are plane surfaces. Light rays from the object side enter the prism P3 from the incident surface S314, change the light traveling direction by the reflection surface S315, leave the prism P3 from the exit surface S316, and finally image on the image plane IMA3. The main function of the prism P3 is to change the traveling direction of the incident light rays in order to achieve the purpose of shortening the total lens length.

In order to maintain excellent optical performance of the lens assembly in accordance with the third embodiment of the invention, the lens assembly 3 satisfies at least one of the following conditions:

$$-20 \leq f3_1/f3 \leq 2 \quad (7)$$

$$0.4 \leq BFL3/TTL3 \leq 0.9 \quad (8)$$

$$2 \leq (R3_{31}-R3_{32})/(R3_{31}+R3_{32}) \leq 10 \quad (9)$$

wherein $f3_1$ is an effective focal length of the first lens L31, f3 is an effective focal length of the lens assembly 3, BFL3 is an interval from the image side surface S311 of the fifth lens L35 to the image plane IMA3 along the optical axis OA3, TTL3 is an interval from the object side surface S32 of the first lens L31 to the image plane IMA3 along the optical axis OA3, $R3_{31}$ is a radius of curvature of the object side surface S36 of the third lens L33 and $R3_{32}$ is a radius of curvature of the image side surface S37 of the third lens L33.

By the above design of the lenses, stop ST3 and prism P3, the lens assembly 3 is provided with a shortened total lens length, an effective corrected aberration and meets the requirement of resolution.

In order to achieve the above purposes and effectively enhance the optical performance, the lens assembly 3 in accordance with the third embodiment of the invention is provided with the optical specifications shown in Table 5, which include the effective focal length, F-number, total lens length, radius of curvature of each lens surface, thickness between adjacent surface, refractive index of each lens and Abbe number of each lens. Table 5 shows that the effective focal length is equal to 4.5294 mm, F-number is equal to 2.4 and total lens length is equal to 8.017 mm for the lens assembly 3 of the third embodiment of the invention.

TABLE 5

Effective Focal Length = 4.5294 mm
F-number = 2.4
Total Lens Length = 8.017 mm

| Surface Number | Radius of Curvature (mm) | Thickness (mm) | Nd | Vd | Remark |
|---|---|---|---|---|---|
| S31 | ∞ | 0.000 | | | Stop ST3 |
| S32 | −5.820 | 0.250 | 1.535 | 55.7 | The First Lens L31 |
| S33 | −7.138 | 0.050 | | | |
| S34 | −9.651 | 0.250 | 1.614 | 25.6 | The Second Lens L32 |
| S35 | −9.725 | 0.050 | | | |
| S36 | 4.622 | 0.489 | 1.535 | 55.7 | The Third Lens L33 |
| S37 | −2.202 | 0.221 | | | |
| S38 | −1.520 | 0.250 | 1.614 | 25.6 | The Fourth Lens L34 |
| S39 | −14.012 | 0.084 | | | |
| S310 | −4.855 | 0.435 | 1.535 | 55.7 | The Fifth Lens L35 |
| S311 | −1.649 | 0.050 | | | |
| S312 | ∞ | 0.210 | 1.517 | 64.2 | Optical Filter OF3 |
| S313 | ∞ | 0.500 | | | |
| S314 | ∞ | 1.670 | 1.847 | 23.8 | Incident Surface, Prism P3 |
| S315 | ∞ | 1.670 | 1.847 | 23.8 | Reflection Surface, Prism P3 |
| S316 | ∞ | 1.838 | | | Exit Surface, Prism P3 |

The aspheric surface sag z of each lens in table 5 can be calculated by the following formula:

$$z = ch^2/\{1+[1-(k+1)c^2h^2]^{1/2}\} + Ah^4 + Bh^6 + Ch^8 + Dh^{10} + Eh^{12}$$

where c is curvature, h is the vertical distance from the lens surface to the optical axis, k is conic constant and A, B, C, D and E are aspheric coefficients.

In the third embodiment, the conic constant k and the aspheric coefficients A, B, C, D, E of each surface are shown in Table 6.

TABLE 6

| | Surface Number | | | | |
|---|---|---|---|---|---|
| | S32 | S33 | S34 | S35 | S36 |
| k | −1.0686E+01 | −3.5542E+00 | 4.6825E+00 | 0.0000E+00 | −2.0866E+01 |
| A | −4.1342E−03 | 1.4406E−02 | 1.5819E−02 | −4.1321E−02 | −3.3339E−02 |
| B | 6.6285E−03 | 1.7562E−02 | −1.8847E−02 | −2.0598E−02 | −1.5812E−02 |
| C | 1.0545E−02 | 1.6993E−03 | −6.9383E−03 | −9.3331E−03 | 7.7011E−04 |
| D | 8.7022E−03 | −9.3882E−04 | −7.4240E−03 | −2.4961E−03 | 2.7032E−03 |
| E | −8.1971E−04 | 5.2465E−04 | −1.1744E−02 | 8.3881E−04 | −4.1677E−05 |

| | Surface Number | | | | |
|---|---|---|---|---|---|
| | S37 | S38 | S39 | S310 | S311 |
| k | −4.5353E+00 | −1.9289E+00 | 8.0682E+01 | −5.4067E+01 | −2.4347E+00 |
| A | 4.5198E−02 | 6.7170E−02 | −4.6525E−02 | −5.8257E−03 | 4.0523E−02 |
| B | −3.1338E−03 | 1.6249E−02 | −7.4528E−03 | 3.4936E−03 | 1.6112E−02 |
| C | 2.6225E−03 | −1.4052E−03 | −2.4437E−03 | 4.0339E−03 | 5.5849E−03 |
| D | 7.3901E−04 | −9.6152E−04 | 5.0047E−04 | 1.1175E−03 | 1.0404E−03 |
| E | −5.8495E−04 | −6.0802E−05 | 1.1268E−03 | −7.2268E−05 | −6.6216E−04 |

For the lens assembly 3 of the third embodiment, the effective focal length f3 is equal to 4.5294 mm, the effective focal length $f3_1$ of the first lens L31 is equal to −63.87000 mm, the interval BFL3 from the image side surface S311 of the fifth lens L35 to the image plane IMA3 along the optical axis OA3 is equal to 5.938 mm, the interval TTL3 from the object side surface S32 of the first lens L31 to the image plane IMA3 along the optical axis OA3 is equal to 8.017 mm, the radius of curvature $R3_{31}$ of the object side surface S36 of the third lens L33 is equal to 4.622 mm and the radius of curvature $R3_{32}$ of the image side surface S37 of the third lens L33 is equal to −2.202 mm. According to the above data, the following values can be obtained:

$$f3_1/f3 = -14.101,$$

$$BFL3/TTL3 = 0.741,$$

$$(R3_{31} - R3_{32})/(R3_{31} + R3_{32}) = 2.820$$

which respectively satisfy the above conditions (7)-(9).

Figure 6A:
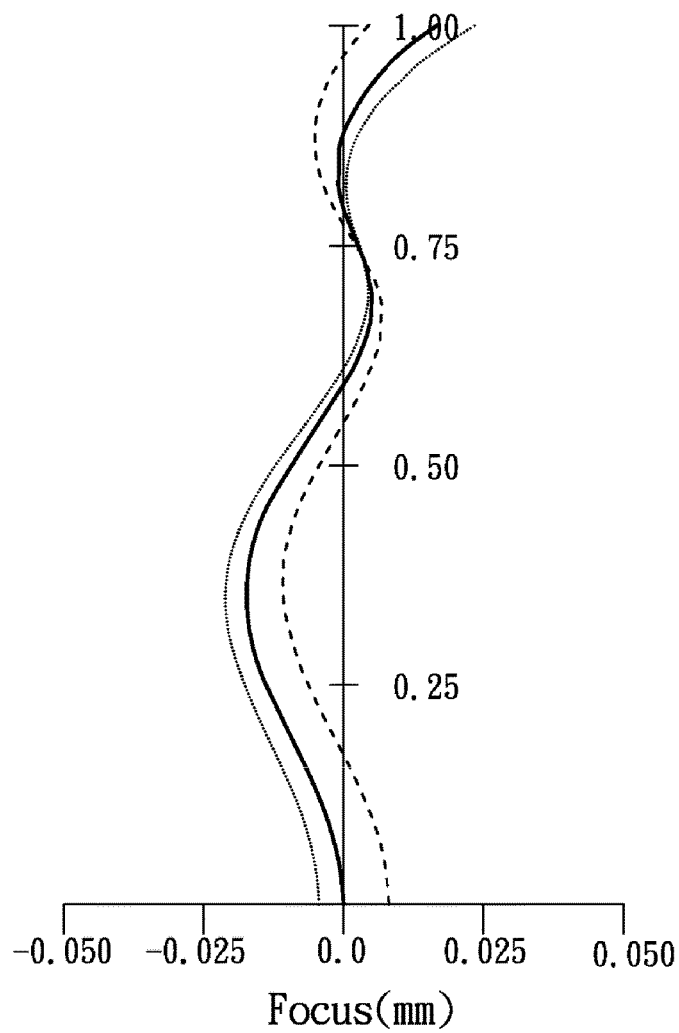
FIG. 6A depicts a longitudinal spherical aberration diagram of the lens assembly in accordance with the third embodiment of the invention.
Figure 6B:
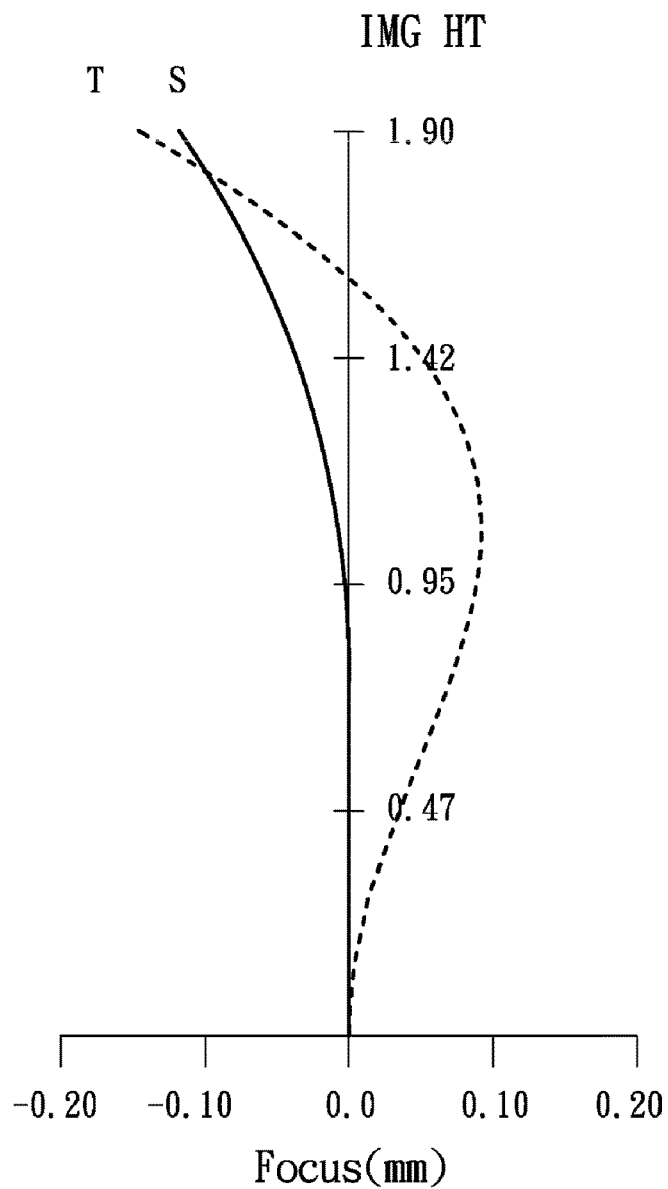
FIG. 6B is an astigmatic field curves diagram of the lens assembly in accordance with the third embodiment of the invention.
Figure 6C:
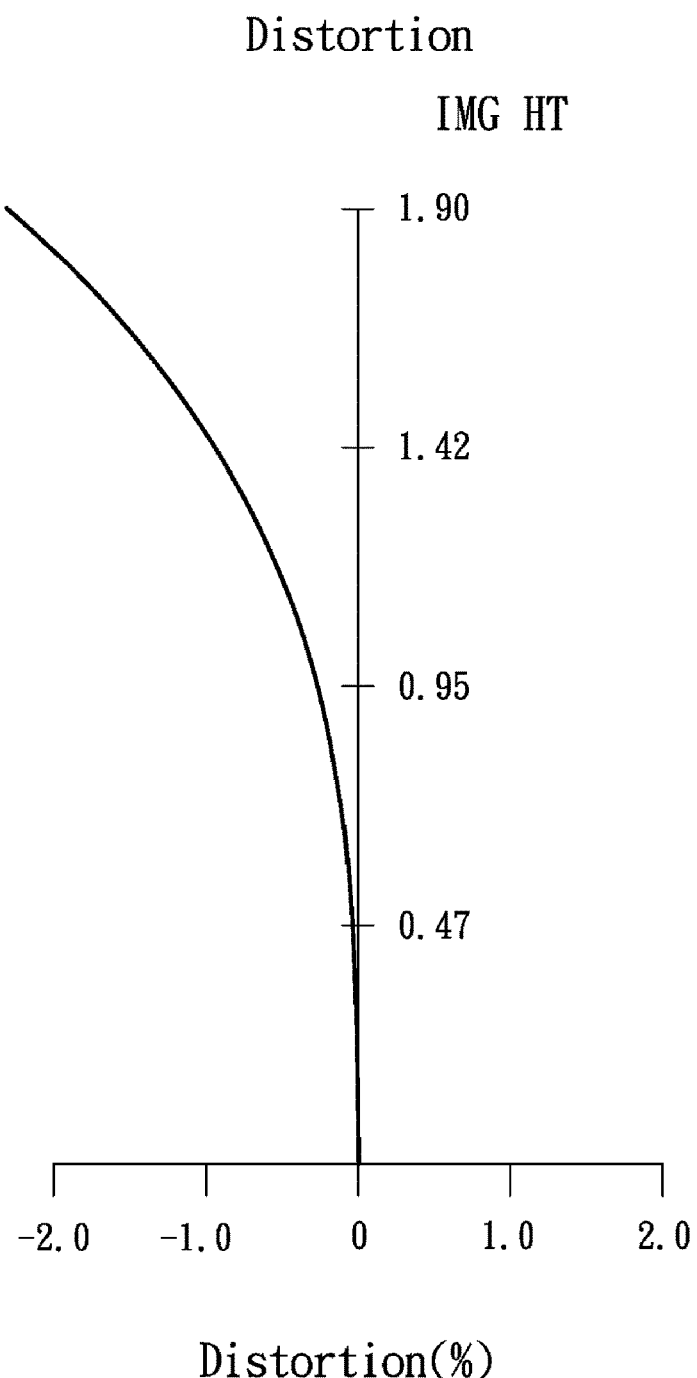
FIG. 6C is a distortion diagram of the lens assembly in accordance with the third embodiment of the invention.

By the above arrangements of the lenses, stop ST3 and prism P3, the lens assembly 3 of the third embodiment can meet the requirements of optical performance as seen in FIGS. 6A-6C, wherein FIG. 6A shows a longitudinal spherical aberration diagram of the lens assembly 3 in accordance with the third embodiment of the invention, FIG. 6B shows an astigmatic field curves diagram of the lens assembly 3 in accordance with the third embodiment of the invention and FIG. 6C shows a distortion diagram of the lens assembly 3 in accordance with the third embodiment of the invention.

It can be seen from FIG. 6A that the longitudinal spherical aberration in the lens assembly 3 of the third embodiment ranges from −0.025 mm to 0.025 mm for the wavelength of 760.0000 nm, 820.0000 nm and 860.0000 nm.

It can be seen from FIG. 6B that the astigmatic field curves of tangential direction and sagittal direction in the lens assembly 3 of the third embodiment ranges from −0.15 mm to 0.10 mm for the wavelength of 820.0000 nm.

It can be seen from FIG. 6C that the distortion in the lens assembly 3 of the third embodiment ranges from −2.3% to 0% for the wavelength of 820.0000 nm.

It is obvious that the longitudinal spherical aberration, the astigmatic field curves and the distortion of the lens assembly 3 of the third embodiment can be corrected effectively. Therefore, the lens assembly 3 of the third embodiment is capable of good optical performance.

What is claimed is:

1. A lens assembly comprising:
    a first lens which comprises a convex surface facing an image side;
    a second lens which comprises a concave surface facing an object side;
    a third lens which is a biconvex lens with positive refractive power;
    a fourth lens which is with negative refractive power and comprises a concave surface facing the object side; and
    a fifth lens which is with positive refractive power and comprises a convex surface facing the image side;
    wherein the first lens, the second lens, the third lens, the fourth lens and the fifth lens are arranged in order from the object side to the image side along an optical axis;
    wherein the lens assembly satisfies:

$-20 \leq f_1/f \leq 2$, $0.4 \leq BFL/TTL \leq 0.9$, where $f_1$ is an effective focal length of the first lens, f is an effective focal length of the lens assembly, BFL is an interval from the convex surface of the fifth lens to an image plane along the optical axis and TTL is an interval from an object side surface of the first lens to the image plane along the optical axis.

2. The lens assembly as claimed in claim 1, wherein the lens assembly satisfies:

$2 \leq (R_{31} - R_{32})/(R_{31} + R_{32}) \leq 10$, wherein $R_{31}$ is a radius of curvature of an object side surface of the third lens and $R_{32}$ is a radius of curvature of an image side surface of the third lens.

3. The lens assembly as claimed in claim 1, wherein at least one of the first lens and the second lens is with negative refractive power.

4. The lens assembly as claimed in claim 1, further comprising a stop disposed between the object side and the first lens.

5. A lens assembly comprising:
    a first lens which comprises a convex surface facing an image side;
    a second lens which comprises a concave surface facing an object side;
    a third lens which is a biconvex lens with positive refractive power;
    a fourth lens which is with negative refractive power and comprises a concave surface facing the object side; and
    a fifth lens which is with positive refractive power and comprises a convex surface facing the image side; and
    a prism which comprises an incident surface facing the convex surface of the fifth lens;
    wherein the first lens, the second lens, the third lens, the fourth lens, the fifth lens and the prism are arranged in order from the object side to the image side along an optical axis;
    wherein the lens assembly satisfies:

$-20 \leq f_1/f \leq 2$, where $f_1$ is an effective focal length of the first lens and f is an effective focal length of the lens assembly.

6. The lens assembly as claimed in claim 5, further comprising an optical filter disposed between the fifth lens and the prism.

7. The lens assembly as claimed in claim 5, wherein the first lens and the second lens have refractive powers of opposite signs.

8. The lens assembly as claimed in claim 5, wherein the lens assembly satisfies:

$-15 \leq f_1/f \leq 1$, wherein $f_1$ is an effective focal length of the first lens and f is an effective focal length of the lens assembly.

9. The lens assembly as claimed in claim 5, wherein at least one of the first lens and the second lens is with negative refractive power.

10. The lens assembly as claimed in claim 9, wherein the first lens and the second lens have refractive powers of opposite signs.

11. The lens assembly as claimed in claim 5, further comprising a stop disposed between the object side and the first lens.

12. A lens assembly comprising:
    a first lens which comprises a convex surface facing an image side;
    a second lens which comprises a concave surface facing an object side;
    a third lens which is a biconvex lens with positive refractive power;
    a fourth lens which is with negative refractive power and comprises a concave surface facing the object side; and
    a fifth lens which is with positive refractive power and comprises a convex surface facing the image side;
    wherein the first lens, the second lens, the third lens, the fourth lens and the fifth lens are arranged in order from the object side to the image side along an optical axis;
    wherein the lens assembly satisfies:

$-20 \leq f_1/f \leq 2$, where $f_1$ is an effective focal length of the first lens and f is an effective focal length of the lens assembly;
    wherein the first lens is with negative refractive power and the second lens is with negative refractive power.

13. A lens assembly comprising:
    a first lens which comprises a convex surface facing an image side;
    a second lens which comprises a concave surface facing an object side;
    a third lens which is a biconvex lens with positive refractive power;
    a fourth lens which is with negative refractive power and comprises a concave surface facing the object side;
    a fifth lens which is with positive refractive power and comprises a convex surface facing the image side;
    an optical filter; and
    a prism which comprises an incident surface facing an image side surface of the optical filter;
    wherein the first lens, the second lens, the third lens, the fourth lens, the fifth lens, the optical filter and the prism are arranged in order from the object side to the image side along an optical axis;
    wherein the lens assembly satisfies:

$2 \leq (R_{31} - R_{32})/(R_{31} + R_3) \leq 10$, where $R_{31}$ is a radius of curvature of an object side surface of the third lens and $R_{32}$ is a radius of curvature of an image side surface of the third lens.

14. The lens assembly as claimed in claim 13, wherein at least one of the first lens and the second lens is with negative refractive power.

15. The lens assembly as claimed in claim 14, wherein the first lens and the second lens have refractive powers of opposite signs.

16. The lens assembly as claimed in claim 14, wherein the first lens is with negative refractive power and the second lens is with negative refractive power.

17. The lens assembly as claimed in claim 13, further comprising a stop disposed between the object side and the first lens.

18. The lens assembly as claimed in claim 13, wherein the lens assembly satisfies:

$$-20 \leq f_1/f \leq 2,$$

wherein $f_1$ is an effective focal length of the first lens and f is an effective focal length of the lens assembly.

19. The lens assembly as claimed in claim 13, wherein the lens assembly satisfies:

$$0.4 \leq BFL/TTL \leq 0.9,$$

wherein BFL is an interval from the convex surface of the fifth lens to an image plane along the optical axis and TTL is an interval from an object side surface of the first lens to the image plane along the optical axis.

20. The lens assembly as claimed in claim 13, wherein the lens assembly satisfies:

$$2 \leq (R_{31} - R_{32})/(R_{31} + R_{32}) \leq 6,$$

wherein $R_{31}$ is a radius of curvature of an object side surface of the third lens and $R_{32}$ is a radius of curvature of an image side surface of the third lens.

* * * * *